United States Patent
Vaeth et al.

(10) Patent No.: US 8,129,673 B2
(45) Date of Patent: Mar. 6, 2012

(54) METHODS FOR CALIBRATION OF PULSED NEUTRON LOGGING

(75) Inventors: John F. Vaeth, Slidell, LA (US); Charles F. Morris, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 341 days.

(21) Appl. No.: 12/492,202

(22) Filed: Jun. 26, 2009

(65) Prior Publication Data

US 2010/0327154 A1    Dec. 30, 2010

(51) Int. Cl.
*G01V 5/10* (2006.01)

(52) U.S. Cl. ................... 250/269.6; 252/600

(58) Field of Classification Search ............ 250/269.6; 252/600

See application file for complete search history.

(56) References Cited

U.S. PATENT DOCUMENTS

| | | | |
|---|---|---|---|
| 4,338,664 A * | 7/1982 | Mayer | 702/11 |
| 4,429,221 A * | 1/1984 | Allen | 250/256 |
| 4,490,676 A * | 12/1984 | Davis et al. | 324/376 |
| 5,699,246 A * | 12/1997 | Plasek et al. | 702/11 |

FOREIGN PATENT DOCUMENTS

GB    2147722 B   *   1/1987

OTHER PUBLICATIONS

Plasek, R.E., Improved Pulsed Neutron Capture Logging with Slim Carbon-Oxygen Tools: Methodology, SPE 30598, Oct. 22-25, 1995.

* cited by examiner

*Primary Examiner* — David Porta
*Assistant Examiner* — Hugh H Maupin
(74) *Attorney, Agent, or Firm* — Darla P. Fonseca; Jeffrey Griffin; Charlotte Rutherford

(57) ABSTRACT

A method for logging a subsurface formation includes acquiring neutron capture data using a pulsed neutron tool at a plurality of locations along a borehole penetrating the subsurface formation, wherein the plurality of locations include a formation zone that contains water; comparing an apparent water salinity or an apparent water sigma value estimated from the neutron capture data acquired in the formation zone that contains water with a water salinity or water sigma value of a water sample from the subsurface formation to produce a calibration parameter for the neutron capture data; and correcting the neutron capture data, based on the calibration parameter, to produce corrected neutron capture data. The method may further include determining a water saturation from the corrected neutron capture data.

17 Claims, 6 Drawing Sheets

METHODS FOR CALIBRATION OF PULSED NEUTRON LOGGING

BACKGROUND OF INVENTION

1. Field of the Invention

The invention relates generally to techniques for calibration of pulsed neutron logging measurements.

2. Background Art

Oil and gas production companies typically want to produce as much hydrocarbon as possible in each down-hole drilling operation. Quite often a well contains recoverable quantities of hydrocarbon gas in formations are bypassed during drilling. More accurate determination and interpretation of the measurement data in these reservoirs would help the operator decide whether production of these reservoirs is justified.

A major component of the interpretation of hydrocarbon content in a formation is to determine water saturation in the formation. Water saturation is the fraction of water in a given pore space. The remainder in the pore space would be hydrocarbon. Neutron and gamma ray logging is commonly used technique for determining formation pore spaces and water saturation. Neutron and gamma ray logging may be performed using different neutron tools, including pulsed neutron tools.

Pulsed neutron capture (PNC) tools have been used for years to evaluate the presence of hydrocarbon in formations. PNC tools generates high energy neutrons that interact with surrounding atoms to produce energy in at least two ways. First, high-energy neutrons collide "inelastically" with nuclei in the formations, exciting the nuclei and causing the nuclei to release gamma rays. Second, these high energy neutrons eventually lose enough energies to reach "thermal neutron" state. Thermal neutrons can be "captured" by nuclei in the formations. Upon capture of thermal neutrons, the nuclei become excited and would release gamma rays when they return to the ground states. Such released gamma rays may be detected by gamma ray detectors to provide a measure of the degrees of thermal neutron captures.

Most PNC tools measure the thermal neutron capture characteristics, or macroscopic capture cross-section ("sigma" or "$\Sigma$"), of a formation by detecting and counting gamma rays of the second type, i.e., those that occur as a result of thermal neutron capture. The thermal neutron capture tools would monitor the emitted gamma rays over a given period of time after a burst of high energy neutrons. Because hydrocarbons generally have low sigma values, the presence of hydrocarbons in a formation would exhibit long neutron capture times (i.e., low capture efficiency). Although pure water also has a low sigma, formation water typically contains salts that would increase sigma values of the formation water. For example, chlorine, usually in the form of salt (NaCl) in formation water, has a large sigma value, as compared to other elements found in the formation. Formation connate water may contain salts at various concentrations, which would result in different sigma values. Therefore, accurate water saturation ($S_w$) based on formation sigma determination would depend on accurate determination of water salinity.

SUMMARY

In one aspect, the present disclosure relates to methods for logging a subsurface formation. A method in accordance with one embodiment of the invention includes acquiring neutron capture data using a pulsed neutron tool at a plurality of locations along a borehole penetrating the subsurface formation, wherein the plurality of locations include a formation zone that contains water; comparing an apparent water salinity or an apparent water sigma value estimated from the neutron capture data acquired in the formation zone that contains water with a water salinity or water sigma value of a water sample from the subsurface formation to produce a calibration parameter for the neutron capture data; and correcting the neutron capture data, based on the calibration parameter, to produce corrected neutron capture data. The method may further include determining a water saturation from the corrected neutron capture data.

In another aspect, the present disclosure relates to systems for analyzing neutron capture data from a subsurface formation. A system in accordance with one embodiment of the invention includes a processor and a memory, wherein the memory stores a program having instructions for: obtaining neutron capture data acquired at a plurality of locations along a borehole penetrating the subsurface formation, wherein the plurality of locations include a formation zone that contains water; comparing an apparent water salinity or an apparent water sigma value estimated from the neutron capture data acquired in the formation zone that contains water with a water salinity or water sigma value of a water sample from the subsurface formation to produce a calibration parameter for the neutron capture data; and correcting the neutron capture data, based on the calibration parameter, to produce corrected neutron capture data.

In yet another aspect, the present disclosure relates to downhole tools for analyzing neutron capture data from a subsurface formation. A tool in according with one embodiment of the invention comprises a pulsed neutron tool including a sonde, a pulsed neutron source mounted in the sonde with a near detector and a far detector mounted longitudinally above the source, and a surface or downhole system including a processor and a memory, wherein the memory stores a program having instructions for: obtaining neutron capture data acquired at a plurality of locations along a borehole penetrating the subsurface formation, wherein the plurality of locations include a formation zone that contains water; comparing an apparent water salinity or an apparent water sigma value estimated from the neutron capture data acquired in the formation zone that contains water with a water salinity or water sigma value of a water sample from the subsurface formation to produce a calibration parameter for the neutron capture data; and correcting the neutron capture data, based on the calibration parameter, to produce corrected neutron capture data.

Other aspects and advantages of the invention will be apparent from the following description and the appended claims.

DETAILED DESCRIPTION

Embodiments of the invention relate to methods for accurately determining water saturations in formation pores. Embodiments of the invention may relate to methods for downhole calibration of pulsed neutron capture tools. These methods are based on basic physics concepts to achieve downhole calibration of sigma data obtained with a downhole pulsed neutron tool. Methods in accordance with embodiments of the invention correlate measured estimates of the borehole water salinities (BSAL) with the actual formation water salinities determined using formation water samples obtained in nearby formation sands (i.e., a formation layer containing water). This correlation may be used to confirm that the salinity (BSAL) of the water in the borehole, which is in contact with a neutron tool and measured by the neutron tool with the BSAL function, in fact contains the same concentration (typically expressed in kppm) of NaCl as that determined in a laboratory by titration of the formation water sample. By more accurate determination of the water salinity, embodiments of the invention may be used to improve the evaluation of the Water Saturation ($S_w$) in a reservoir. More accurate determination in turn improves the determination of hydrocarbon saturation or hydrocarbon quantities.

As noted above, well logging systems for measuring neutron absorption in a formation typically uses a pulsed neutron source (e.g., the Reservoir Saturation Tool (RST™) from Schlumberger Technology Corp., Houston, Tex.). Pulsing the neutron source permits the measurement of the macroscopic thermal neutron absorption capture cross-section ($\Sigma$) of a formation. The capture cross-section of a reservoir rock is indicative of the porosity, formation water salinity and formation water saturation ($S_w$). Knowing the water saturation ($S_w$) would then permit one to determine the quantity of hydrocarbons contained in the pore spaces.

Figure 1:
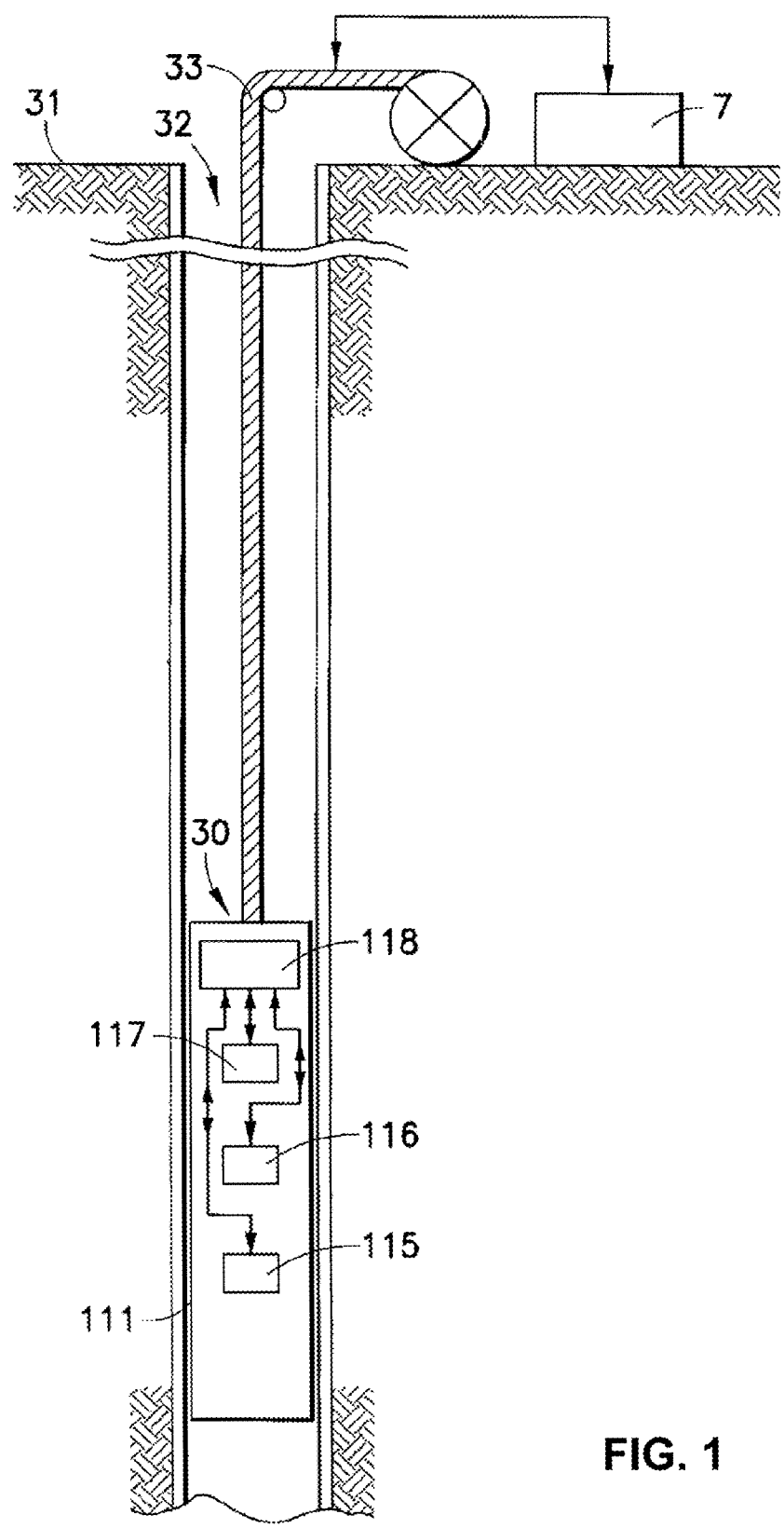
FIG. 1 shows a prior art pulsed neutron tools disposed in a borehole penetrating a formation.

FIG. 1 shows an example of a neutron logging tool, which may be used with embodiments of the invention, disposed in a borehole. As shown in FIG. 1, a subsurface formations 31 is traversed by a borehole 32. A pulsed neutron capture tool 30 is suspended in the borehole 32 on an armored cable 33, the length of which substantially determines the relative depth of the neutron tool 30. A neutron tool can be operated in a cased or uncased well. Surface equipment 7 can include a processor subsystem and recorder and communicates with the all the downhole equipment. Although the neutron tool 30 is shown as a single body, the tool may alternatively comprise separate components such as a cartridge, sonde or skid, and the tool may be combinable with other logging tools.

The pulsed neutron tool 30 may be any suitable neutron tool known in the art. The neutron tool 30 may include a housing 111 in the shape of a cylindrical sleeve for moving in a borehole or a production tubing. Although not illustrated in FIG. 1, the neutron tool 30 may also have an eccentering device for forcing the tool against the wall of a borehole or against well casing. At least one accelerator or pulsed neutron source 115 is mounted in the sonde with a near detector 116 and a far detector 117 mounted longitudinally above the accelerator 115, with increasing axial distances. One or more further detectors (not shown) can also be provided. A downhole processor unit 118 may serve acquisition, control, processing, and telemetry functions. Among other functions, the processor unit 118 may be used to control the timing of burst cycles of the neutron accelerator 115, the timing of detection time gates for near and far detectors 116, 117 and to telemeter count rate and other data via cable 33 and uphole telemetry circuitry, which can be part of surface instrumentation 7. The surface processor of surface equipment 7 can, for example, receive gamma ray spectral data from near and far detectors 116 and 117. The signals can be recorded in the surface equipment 7, for example, as a log as a function of well depth.

Alternatively, the downhole processor unit 118 may store and process the signals downhole. Both the downhole processor unit 118 and the surface equipment 7 would include processor(s) and one or more memories. One skilled in the art would appreciate that methods of the invention may be implemented as a software stored in the downhole processor unit 118 or the surface equipment 7.

Although the neutron capture tool 30 illustrated in FIG. 1 is a wireline tool, one of ordinary skill in the art would appreciate that embodiments of the invention may also be used with a logging-while-drilling neutron tool.

As noted above, neutron capture measurements may use Dual-Burst thermal decay logging. For a brief discussion of this technique, see U.S. Pat. No. 5,699,246. In a dual-burst method, a neutron burst sequence is provided which includes two bursts. A first short burst of fast neutrons is provided at a location in the borehole, thereby irradiating borehole materials and the earth formation adjacent to that borehole location. Because the short burst of neutrons do not penetrate far into the formations, the gamma ray signals measured after the short burst are indicative of thermal neutron capture by nuclei in the borehole and in the formation near the borehole.

Next, a relatively long burst of fast neutrons is applied at substantially the same location within the borehole, irradiating the borehole materials and the earth formation adjacent the borehole location. Because the longer burst of neutrons may penetrate farther into the formation, the gamma ray signals collected after the long burst are more reflective of thermal neutron captures by materials in the formation that are relatively farther away from the borehole. Most modern neutron tools are capable of such dual-burst acquisitions. One example of such tools is the RST™ from Schlumberger Technology Corporation (Houston, Tex.).

Figure 2:
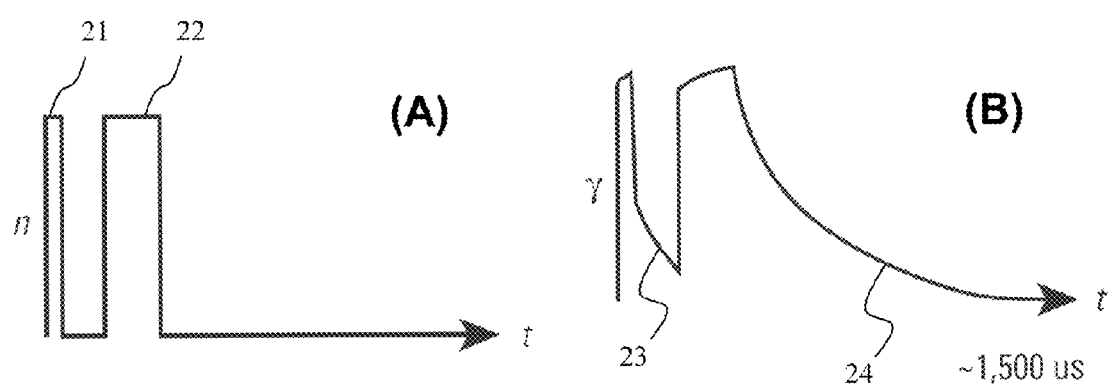
FIG. 2A shows a schematic illustrating a dual pulse mode for a pulsed neutron tool.
FIG. 2B shows a schematic illustrating gamma ray signals as a function of time after the dual pulses shown in FIG. 2A.

FIG. 2 shows a schematic illustrating a dual burst pulse mode and the gamma-ray decay signals as measured by the detectors. As shown in FIG. 2A, in the dual pulse mode, a short pulse 21 of neutron is transmitted into the formation, followed by a longer pulse 22 a short time later. The thermal neutron capture generated gamma ray count rates are monitored by the detectors appear as decay curves 23 and 24 (FIG. 2B), corresponding to the short pulse 21 and long pulse 22, respectively. The rates of decays of such curves 23 and 24 can be analyzed to derive the neutron capture cross sections.

The macroscopic neutron absorption capture cross-section ($\Sigma$) measured by pulsed neutron logging (PNL) tools represent aggregate properties of the formation matrices and fluids (e.g., hydrocarbons and water) in the formation pores. By analyzing these macroscopic measurements based on contributions from individual components, it is possible to estimate the contributions from the formation water fractions, which in turn can be used to derive the formation water saturation ($S_w$). A common method for such analysis is shown in the following equation:

$$S_w = \frac{\sum \log - \sum \text{matrix} - \theta \text{eff} \left( \sum hyd - \sum \text{matrix} \right) - V\text{shale} \left( \sum \text{shale} - \sum \text{matrix} \right)}{\theta \text{eff} \left( \sum \text{water} - \sum hyd \right)},$$

wherein $S_w$ is water saturation, $\Sigma$ log is the macroscopic formation sigma value, $\Sigma$matrix is the matrix sigma value, $\Sigma$hyd is the hydrocarbon sigma value, $\Sigma$shale is the shale sigma value, $\Sigma$water is the water sigma value, vshale is the volume fraction of shale layers, and θeff is effective porosity.

The contribution of the formation water fractions in the measured macroscopic capture cross section ($\Sigma$) is a function of both the water saturation ($S_w$) and the water salinity. Therefore, accurate determination of water salinity is necessary in order for the water saturation ($S_w$) to be determined with accuracy. Accordingly, in accordance with embodiments of the invention, a major component of the interpretation of hydrocarbon content in a formation is to locate and analyze a water-filled formation matrix (near the hydrocarbon bearing interval) for downhole calibration of the sigma measurement. This technique will calculate the water salinity of the produced (connate) formation water. The connate formation water from existing perforated zone of interest (ZOI) is inside the wellbore and in physical contact with the logging tool. The neutron tool sigma measured in this water interval can be used to calibrate the formation water salinity. In addition, the neutron tool borehole sigma measurement (i.e., formation neutron capture data) can be used to estimate the salinity of the formation water from the BSAL parameter.

Therefore, a comparison of the produced water's salinity with the formation water salinity derived from Sigma log in a water zone can provide a unique downhole calibration of the neutron tool. Once the accuracy of the neutron tool water zone sigma data in the downhole environment can be ascertained, calculation of the primary formation $S_w$ (and ultimately the Shyd) is possible with a higher degree of accuracy.

As shown in the following equation (1), apparent water Sigma can be derived from formation sigma ($\Sigma$ log), matrix sigma ($\Sigma$matrix), contribution of shale layer sigma, and the effective porosity ($\theta_{eff}$). If one takes the sigma measurements in a water-containing formation zone (e.g., a sand layer), then the contribution of the shale can be ignored. As a result, Equation (1) can be simplified to Equation (2) below.

$$\sum_{water\text{-}apparent} = \frac{\sum \log - \sum \text{matrix} - V\text{shale} \left( \sum \text{shale} - \sum \text{matrix} \right)}{\theta_{eff}} + \sum \text{matrix} \quad (1)$$

$$\sum_{water\text{-}clean} = \frac{\sum \log - \sum \text{matrix}}{\theta_{Tot}} + \sum \text{matrix} \quad (2)$$

$$\sum_{water\text{-}clean} = \frac{xKppmNaCl + 50}{2.5} \quad (3)$$

The inventors of the present invention have found that the water Sigma ($\Sigma$water) can be easily derived from the salt concentration in the water via an empirical relationship, such as the one shown in Equation (3) above. In Equation (3) the concentration of NaCl (x kppm, based on the weight equivalent of NaCl) in the water sample may be determined by titration in a laboratory. Chloride titration is conventional and can be performed using, for example, a solution of silver nitrate ($AgNO_3$) or other similar titration. Inventors of the invention have found that once the chloride concentration is accurately determined, the water sigma can be readily calculated using the empirical formula shown in Equation (3).

The water Sigma derived from titration of a produced water (i.e., Equation (3)) can be compared with that obtained from formation sigma logging (e.g., from Equation (2)). This comparison provides a means to calibrate the water Sigma values derived from formation sigma logging. In other words, this provides a convenience methods for neutron tool calibration. Therefore, the neutron capture data can be corrected accordingly.

Figure 3:
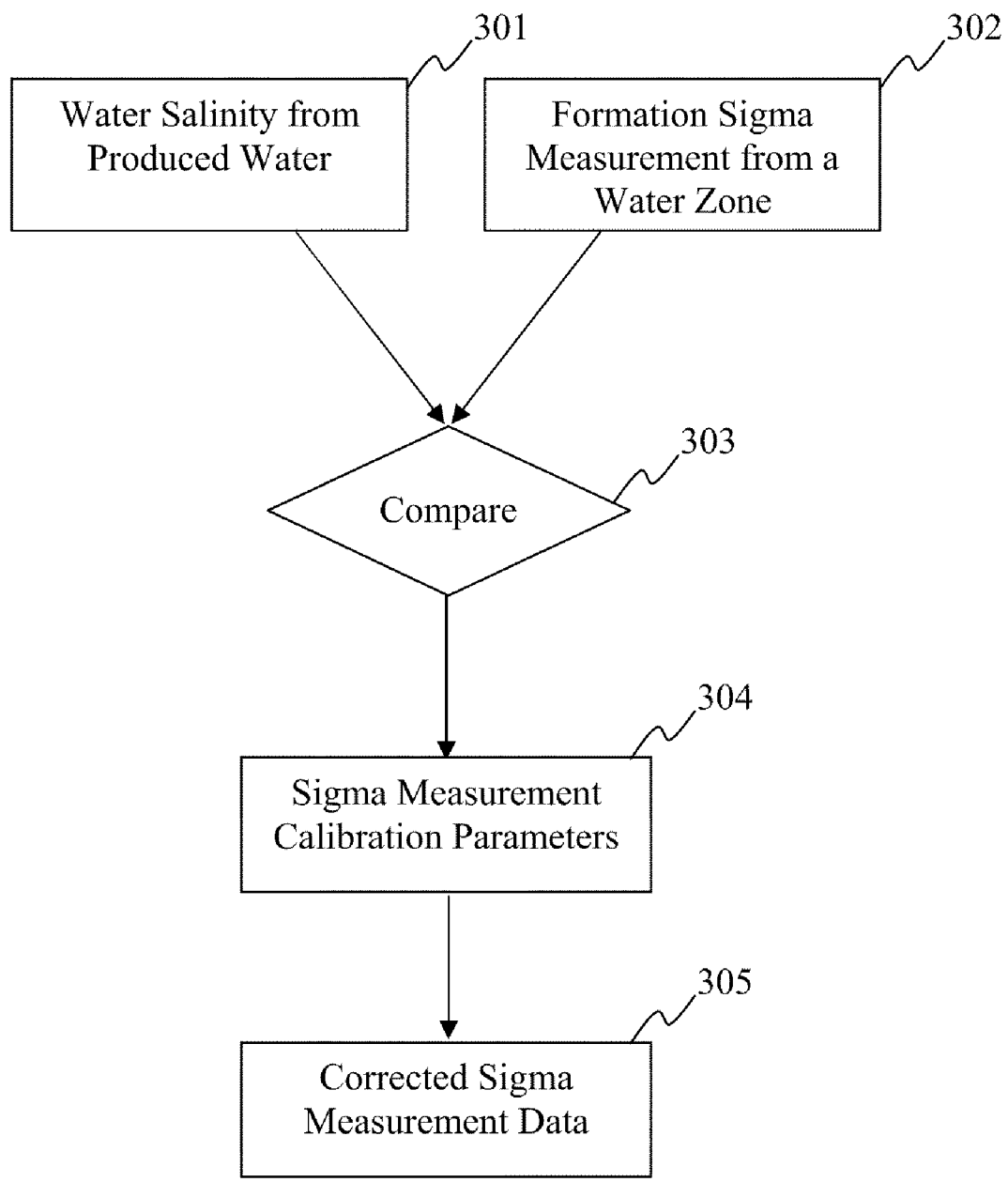
FIG. 3 shows a flow chart illustrating a method in accordance with one embodiment of the invention.

FIG. 3 shows a flow chart, illustrating an embodiment of the invention. As shown in FIG. 3, water salinity (or water sigma) determined for a produced water sample (301) may be compared with the water salinity estimated from the formation sigma measurement data (neutron capture data) obtained in a water-containing zone (302). This comparison (303) will produce a calibration parameter (304) that might be used to correct formation sigma measurement data (neutron capture data) to produce corrected sigma measurement data (corrected neutron capture data) (305). Once the corrected sigma measurement data (corrected neutron capture data) are available, they can be processed with existing methods to estimate the water saturation for the formations. A method for such processing, using RST™ tool algorithm as an example, is described below.

Neutron Tool Processing Chain

In the sigma mode, a neutron tool measures macroscopic formation sigma, which can then be processed to derive various formation parameters such as formation capture cross section, formation porosity, and borehole salinity. While different types of neutron tools can be operated in different manners to obtain these measurements, modern pulsed neutron tools (such as RST™) are often operated in Dual-Burst mode to obtain these measurements. Once these measurements are available, various software can then be used to convert the apparent sigma quantities ($\Sigma$) into various formation parameters.

The following description will use RST™ as an example. However, one skilled in the art would appreciate that measurements obtained with similar tools may be processed in a similar manner. In a typical processing, the macroscopic formation sigma data obtained with a pulsed neutron tool (e.g. RST™) may be converted by a suitable software program to provide formation capture cross section or sigma (SFFC), formation porosity (TPHI), and salinity of the borehole fluid (BSAL). Detailed description of these processes can be found, for example, in Plasek et al. (1995), "*Improved Pulsed Neutron Capture Logging With Slim Carbon-Oxygen Tools: Methodology*," SPE Annual Technical Conference and Exhibition, Dallas, Tex., Oct. 22-25, 1995 (SPE 30598) and in the PRE-Plus User's Guide: GeoFrame PRE-Plus User's Guide: RST Sigma Phase 1 & RST Sigma Phase 2.

As noted above, the formation capture cross section ($\Sigma$) is determined by sending a burst of neutrons from the tool and detecting the gamma ray signals generated by nuclei that captured the thermal neutrons. The detected gamma ray count rates will decrease with time as the neutrons are captured by the surrounding materials (neutron capture) and as they diffuse farther away (neutron diffusion). $\Sigma$ is inferred from this observed decline in the gamma ray count rates versus time.

However, the gamma ray signals acquired by the detectors do not simply result from thermal neutron capture by the materials in the formation. Instead, other environmental factors may also contribute to the observed decline in gamma ray count rates, such as neutron diffusion and the "borehole contamination." These effects due to other environmental factors would need to be accounted for in order to derive accurate formation $\Sigma$ under the operating conditions. Such environmental effects (e.g., the borehole contamination) may be corrected for based on parameters, such as borehole size, casing size, casing weight, borehole fluid salinity, porosity, and lithology. However, this approach may not remove all possible "contaminations" in the measurement data.

An additional approach is to use a database of tool responses acquired in controlled laboratory environments for tool/response calibration. The database of measurements in controlled laboratory environments should include variables that span the ranges of interest. The database is then parameterized in terms of the environmental variables that influence the measurements. Traditionally, the parameterization is static, in the sense that it consists of equations with fixed coefficients. At every depth in the well, the equations are evaluated to convert the tool response to the environmentally corrected answer products.

To cover a wide range of environmental factors, the static parameterization requires a relatively complex function. With increasing complexity, it becomes more difficult to constrain the function to be both accurate within the database and physically reasonable when extrapolating outside of it. In addition, each time the database is expanded, the parameterization would need to be reformulated in terms of the new equations and coefficients, possibly resulting in different accuracy and extrapolation properties.

To avoid these shortcomings, modern tools may provide methods and algorithms for deriving Sigma/Porosity based on dynamic database parameterization, which may be performed at each depth level in a well. To illustrate such methods, the following description will use RST™ Sigma/Porosity algorithm as an example, e.g., the parameter names may be those found in RST™ Sigma/Porosity program.

A typical neutron tool in the sigma mode measures the apparent borehole sigma (SBNA), the ratio of the near-to-far detector capture count rates (TRAT), and the apparent formation sigma (SFFA). Based on these measurements, the desired borehole salinity (BSAL), formation porosity (TPHI), and corrected formation sigma (SFFC) may be derived. For example, the functional dependence of these corrected quantities on the SBNA, TRAT, and SFFA may be expressed as:

$$BSAL = BSAL(SBNA, TRAT, SFFA, CID, T_{csg}, T_{cem}, Lith) \quad (4)$$

$$TPHI = TPHI(TRAT, BSAL, SFFA, CID, T_{csg}, T_{cem}, Lith) \quad (5)$$

$$SFFC = SFFC(SFFA, TPHI, BSAL, CID, T_{csg}, T_{cem}, Lith) \quad (6)$$

wherein CID is the casing inside diameter, $T_{csg}$, is the thickness of the casing, $T_{cem}$, is the thickness of the cement, Lith is the formation lithology, SBNA is apparent borehole sigma, TRAT is the ratio of the near-to-far detector capture count rates, and SFFA is the apparent formation sigma.

For any measurements of (SBNA, TRAT, SFFA) in a given lithology, a local parameterization of (BSAL, TPHI, SFFC) may be made as a first order expansion of each independent variable, with the exception of TRAT, which requires a second order term, as shown below:

$$BSAL = {}^B b_0 + {}^B b_1 SBNA + {}^B b_2 TRAT^2 + {}^B b_3 SFFA + {}^B b_4 CID + {}^B b_5 T_{csg} + {}^B b_6 T_{cem} + \ldots$$

$$TPHI = {}^T b_0 + {}^T b_1 TRAT + {}^T b_2 TRAT^2 + {}^T b_3 BSAL + {}^T b_4 SFFA + {}^T b_5 CID + {}^T b_6 T_{csg} + {}^T b_7 T_{cem} + \ldots$$

$$SFFC = {}^S b_0 + {}^S b_1 SFFA + {}^S b_2 TPHI + {}^S b_3 BSAL + {}^S b_4 CID + {}^S b_5 T_{csg} + {}^S b_6 T_{csm} + \ldots$$

According to the above equations, each database point may be formulated in terms of the b coefficients and may be weighted according to how close it is to the measured point in the multidimensional independent variable space. The weight may decrease as the multidimensional distance between the database point and the measured point increases. Weighting, as described, can place emphasis on the nearest neighbors of the measured point. This over-determined system of equations may be solved for the b's using any suitable technique, such as the classical weighted multiple linear regression (WMLR) technique Bevington 1969, "*Data Reduction and Error Analysis for the Physical Sciences*," McGraw-Hill, New York (1969).

Borehole salinity (BSAL) may be derived first (e.g., Equation (4)) and adaptively filtered in the parameterization. The adaptive filtering would use filters of different lengths. The maximum filter length used may be controlled by the user through the parameter BSFL (RST™ BSAL Filter Length). For example, the filter length may be long (e.g., 25 ft) in areas where the borehole environment is not changing and may shrink down to a small value (e.g., 1.5 ft) in regions where there is a sharp transition, such as an oil-water interface or a packer.

As shown in Equation (4), the gamma ray measurement data, which include apparent borehole sigma (SBNA), near-far detector count rate ratio (TRAT), and apparent formation sigma (SFFA) data, together with borehole and formation parameters (CID, $T_{csg}$, $T_{cem}$, Lith), may be processed to derive borehole salinity (BSAL).

The adaptively filtered borehole salinity (BSAL) may then be used as an input to derive formation porosity (TPHI) using Equation (5) shown above. Then, the borehole salinity (BSAL) and formation porosity (TPHI) may be used as inputs to derive the corrected formation sigma (SFFC) using Equation (6) shown above.

FIG. 3 shows a flow chart illustrating this process. As shown, The measurement data (shown as 301) are used first to derive the borehole salinity (BSAL) (shown as 302), which is then used to derive formation porosity (shown as 303). Finally, the borehole salinity and the formation porosity are used to derive the corrected formation sigma (shown as 304). The corrected formation sigma data are then used to derive the formation water salinity and saturation (shown as 305).

For air-filled boreholes, apparent borehole sigma (SBNA) may be used in place of borehole salinity (BSAL) in the above calculations. Once the formation sigma is corrected, the corrected measurements may be used to derive the corrected formation water salinity and, therefore, corrected formation water saturation.

The above described calculation may be performed at each depth level in a well. In each calculation, the weights and the b's may be determined for the new measurement, used to compute (BSAL, TPHI, SFFC), and then discarded. Finally, the apparent SFFA and corrected SFFC may be alpha-processed (Galford et al., "*Enhanced Resolution Processing of Compensated Neutron Logs*", SPE Formation Evaluation (June 1989), 131-137) to improve precision, and the result is output as a fully corrected sigma answer product, SIGM. The DLIS (digital log interchange standard; also know as API recommended practice 66) channel SIBF (Sigma Borehole Fluid) is the value of BSAL converted into capture units of salt water.

Alternatively, one may input a known formation porosity (TPHI) and/or borehole salinity (BSAL), instead of using the weighted multiple linear regression (WMLR) to derive these parameters. The formation porosity may be obtained with other measurements. The borehole salinity may be directly obtained by measurements in a zone that produces connate water. This alternative can provide improved precision and accuracy of the final answer SIGM.

Sometimes, it is useful to compute a corrected formation sigma for the near detector, SFNC. This may be computed by replacing SFFA with SFNA, and setting up a WMLR to solve for a new set of coefficients $^{S}c$:

$$SFNC = {}^{S}c_0 + {}^{S}c_1 SFNA + {}^{S}c_2 TPHI + {}^{S}c_3 BSAL + {}^{S}c_4 CID + {}^{S}c_5 T_{csg} + {}^{S}c_6 T_{cem} + \ldots$$

Again, if the borehole is air-filled, the apparent borehole sigma (SBNA) may be used in place of BSAL.

Borehole Salinity Measurement and Compensation

The apparent borehole sigma (SBNA) includes capture cross section contributions from all materials near the detectors, including borehole fluid, casing, cement and the tool materials themselves. Therefore, it would be difficult to define a static transformation between SBNA and the borehole fluid salinity. The dynamic parameterization approach efficiently separates out the borehole fluid component of SBNA to provide the purely-borehole fluid salinity (BSAL) and the equivalent sigma of borehole fluid (SIBF). Therefore, BSAL and SIBF are not directly comparable to the borehole sigma quantity obtained by other thermal time decay tools (e.g., SIBH of TDT-P™ from Schlumberger Technology Corp.), because these borehole sigma quantities (e.g., SIBH) reflect the capture cross sections of everything in the borehole, including the borehole fluid, casing, cement and tool materials.

Frequently, the salinity of the borehole fluid may change over the course of a monitoring project; or the salinity of the formation may change, as in a Log-Inject-Log job. Therefore, it is important that an algorithm is able to properly distinguish between the formation sigma and borehole sigma under a wide range of conditions. Tools that use the traditional static parameterization approach would have difficulty in compensating for borehole salinity in regions where formation sigma values are higher than the borehole sigma values (i.e., crossover).

To demonstrate borehole compensation performance, a test is made of the RST™ database measurements in three 10 inch limestone formations, with a 7 inch 32 lb/ft completion, and assigned porosities of 0, 18 and 41 pu. The formation fluid salinities were 0, 70, 140, and 210 kppm, while the borehole fluid salinities were 0, 25, 50, 100, and 200 kppm. The test produces consistent results.

EXAMPLE 1

Validation of Accuracy

Using the available RST™ database, methods in accordance with embodiments of the invention were evaluated in three independent test pit facilities. For example, RST-A and RST-B databases from the EECF were reprocessed with the dynamic parameterization algorithm described above, and the resulting values of BSAL, TPHI, and SIGM were compared with the assigned database values. In general, for non-crossover data, the average uncertainties were found to be as follows:

TABLE 1

| Accuracy Uncertainty in Non-Crossover Conditions (+/− one standard deviation) | | |
| --- | --- | --- |
| Answer | RST-A | RST-B |
| SIGM | 0.22 cu | 0.20 cu |
| TPHI | 0.9 pu | 1.7 pu |
| BSAL | 5.5 kppm | 6.9 kppm |

As shown in the Table 1, methods of the invention are able to produce very accurate results. This accuracy is demonstrated with a very extensive Sigma/Porosity database. The exceptional accuracy of these answer products validates the algorithm described above. The slight differences between the RST-B and RST-A accuracies are primarily due to the focused RST-B detector shielding.

EXAMPLE 2

In another test, both tools (RST-B and RST-A) were also logged in EUROPA (Locke et al., "*Characteristics of Rock Formations for the Improved Calibration of Nuclear Logging Tools*," Transactions of the 15th European Formation Evaluation Symposium, Stavanger (May 3-5, 1993), Paper R), an industry standard facility located at the time in Aberdeen, Scotland. EUROPA was constructed and supported by a consortium of oil companies for the purpose of benchmarking nuclear tool measurements.

The seventeen EUROPA formations consisted of slabs of quarried rock stacked on top of each other and ranging in porosity from 0 to 28 pu. Lithology was either limestone, sandstone or dolomite. EUROPA officials exhaustively characterized each formation using X-ray and nuclear reactor measurements on 12 core samples from each slab.

The EUROPA formations had either an 8-1;2 inch or 12-1;4 inch borehole and were saturated with fresh, 100 kppm, or 200 kppm water. A removable 7 inch 29 lb/ft cemented casing completion was used for cased hole measurements. The RST-A was logged in open hole in all EUROPA formations, as well as in cased hole in all 8-1;2 inch formations.

The TPHI porosity answer product was validated in the industry standard API porosity test pits. These formations consist of slabs of quarried limestone, with a 7-7;8 inch borehole (open hole) and assigned porosities of 1.9, 19 and 26 pu. The slabs are stacked and aligned with particular care to produce an exceptionally smooth borehole because the neutron porosity measurement is very sensitive to standoff. Again, the methods of the invention produced accurate results in this test.

EXAMPLE 3

Methods of the invention may be tested with any extensive database of tool response measurements, which may be acquired at any calibration facility having known environmental effects, such as the Schlumberger Environmental Effects Calibration Facility (EECF) in Houston, Tex.

In one example, three tools were characterized simultaneously: RST™-A, RST™-B and TDT™-P. Tool responses were recorded in more than thirty different formations, with a range of formation and borehole fluid salinities, and a number of casing and cement completions. Characterization of air-filled borehole is included. The Sigma/Porosity database is summarized in the table below (Table 2).

Measurements in limestone covered the entire set of database conditions. Measurements in sandstone and dolomite were omitted for two formation fluid salinities and two borehole fluid salinities. Tool response in these conditions was estimated for sandstone using the limestone response benchmarked at common measured points.

All measurements were made with the tool eccentered against the casing or borehole wall. Completions were made using class H cement mixed with fresh water.

For medium and high porosities, formations were constructed using gravel in tanks. Low porosities were represented by zero pu quarried rock formations. Because of the unavailability of high quality zero pu sandstone formations, the response in some zero pu points for sandstone was estimated using the limestone response (see table below).

The database is intended to provide a map between tool response and intrinsic truth. However, intrinsic truth in the laboratory can only be approximated through very high accuracy measurements. Thus, database formation properties should be referred to as assigned values rather than intrinsic values.

The accuracy of database assignments directly affects the accuracy of the final tool answer products. Very high accuracy measurements of the formation and formation samples were used to assign the database values of formation sigma, porosity, and borehole salinity.

The average formation porosity $\phi$ was determined and validated to an accuracy of 0.1 pu by measuring both the volume and the weight of all the formation components. A Compensated Neutron Log (CNL®) survey was performed to verify the average porosity value and the vertical and azimuthal symmetry.

Water salinity was determined through a calibrated titration procedure and converted into fluid sigma $\Sigma_{fluid}$ using SNUPAR cross section tables (McKeon et al., "SNUPAR—A Nuclear Parameter Code for Nuclear Geophysics Applications", Nuclear Geophysics, (1988) 2, No. 4,215-230). Water, samples were analyzed for contamination by high cross section trace elements. Titrations were calibrated using standard solutions prepared in the EECF and/or supplied by commercial vendors. The resulting titration accuracy is better than 1 kppm NaCl.

Sigma of the rock matrix $\Sigma_{matrix}$ was determined in two independent ways: a gross macroscopic cross section measurement in a commercial reactor, and a full elemental analysis processed through SNUPAR.

The assigned formation sigma $\Sigma_{formation}$ was then computed as $$\Sigma_{formation}=(1-\phi)\Sigma_{matrix}+\phi S_{fluid}\Sigma_{fluid}$$

Again, embodiments of the invention produced accurate results in this test.

TABLE 2

| Borehole Size (in) | Casing Size (CID in) | Casing Weight (lb/ft) | Lithology[1] | | | Porosity[2] | | | Formation Fluid[3] (kppm NaCl) | | | | Borehole Fluid[4] (kppm NaCl) | | | | |
|---|---|---|---|---|---|---|---|---|---|---|---|---|---|---|---|---|---|
| 4.125 | — | — | — | | | — | | | — | | | | — | | | | |
| 4.125 | — | — | — | | | — | | | — | | | | — | | | | |
| 4.125 | — | — | — | | | — | | | — | | | | — | | | | |
| 6 | Open Hole | | L | S | D | Z* | M | H | 0 | 70 | 140 | 210 | 0 | 25 | 50 | 100 | 200 | Air |
| 6 | 4.5 | 10.5 | L | S | D | Z* | M | H | 0 | 70 | 140 | 210 | 0 | 25 | 50 | 100 | 200 | Air |
| 6 | 5.0 | 18 | L | S | D | Z* | M | H | 0 | 70 | 140 | 210 | 0 | 25 | 50 | 100 | 200 | Air |
| 8 | Open Hole | | L | S | D | Z* | M | H | 0 | 70 | 140 | 210 | 0 | 25 | 50 | 100 | 200 | Air |
| 8 | 5.5 | 15.5 | L | S | D | Z* | M | H | 0 | 70 | 140 | 210 | 0 | 25 | 50 | 100 | 200 | Air |
| 8 | 7.0 | 32 | L | S | D | Z* | M | H | 0 | 70 | 140 | 210 | 0 | 25 | 50 | 100 | 200 | Air |
| 10 | 5.5 | 15.5 | L | S | D | Z* | M | H | 0 | 70 | 140 | 210 | 0 | 25 | 50 | 100 | 200 | Air |
| 10 | 7.0 | 32 | L | S | D | Z* | M | H | 0 | 70 | 140 | 210 | 0 | 25 | 50 | 100 | 200 | Air |
| 10 | 7.625 | 26.4 | L | S | D | Z* | M | H | 0 | 70 | 140 | 210 | 0 | 25 | 50 | 100 | 200 | Air |
| 12 | 7.625 | 26.4 | L | S | D | Z* | M | H | 0 | 70 | 140 | 210 | 0 | 25 | 50 | 100 | 200 | Air |
| 12 | 9.625 | 32.3 | L | S | | Z* | M | H | 0 | 70 | 140 | 210 | 0 | 25 | 50 | 100 | 200 | Air |
| 12 | 9.625 | 53.5 | L | S | | Z* | M | H | 0 | 70 | 140 | 210 | 0 | 25 | 50 | 100 | 200 | Air |

*These zero pu points are estimated for sandstone using the limestone response.
[1] L = limestone, sandstone, D = dolomite
[2] Z = zero (0 pu), M = medium (15-20 pu), H = high (33 pu for sand, 38-43 pu for lime and dolomite)
[3] The 70 and 210 kppm points are modeled for sand and omitted for dolomite.
[4] The 25 and 100 kppm points are modeled for sand and omitted for dolomite.

EXAMPLE 4

Figure 4A:
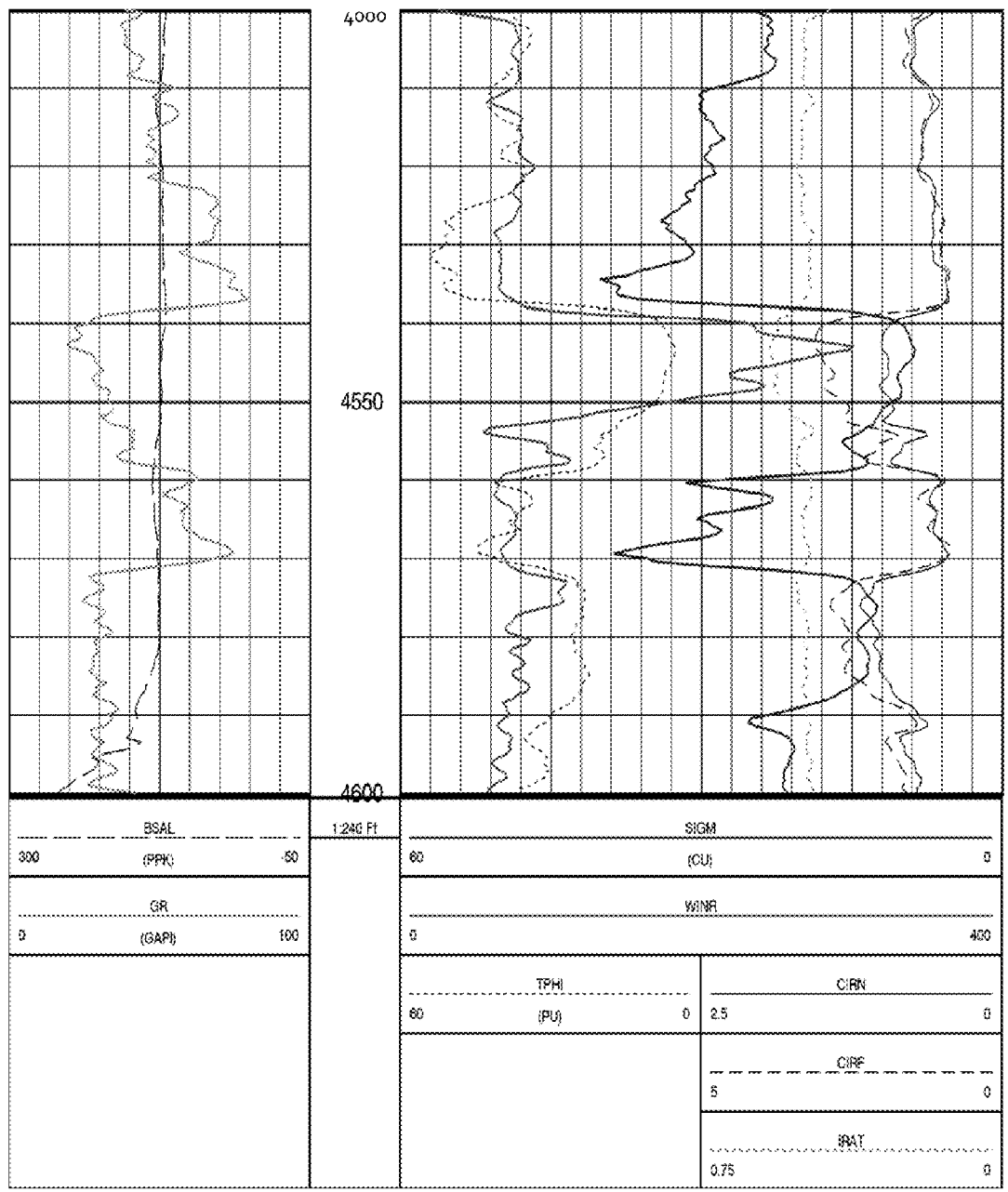
FIG. 4A shows a field test results, illustrating that the water salinities estimated with a method of the invention agree with that determined by laboratory titration of a formation water sample.
Figure 4B:
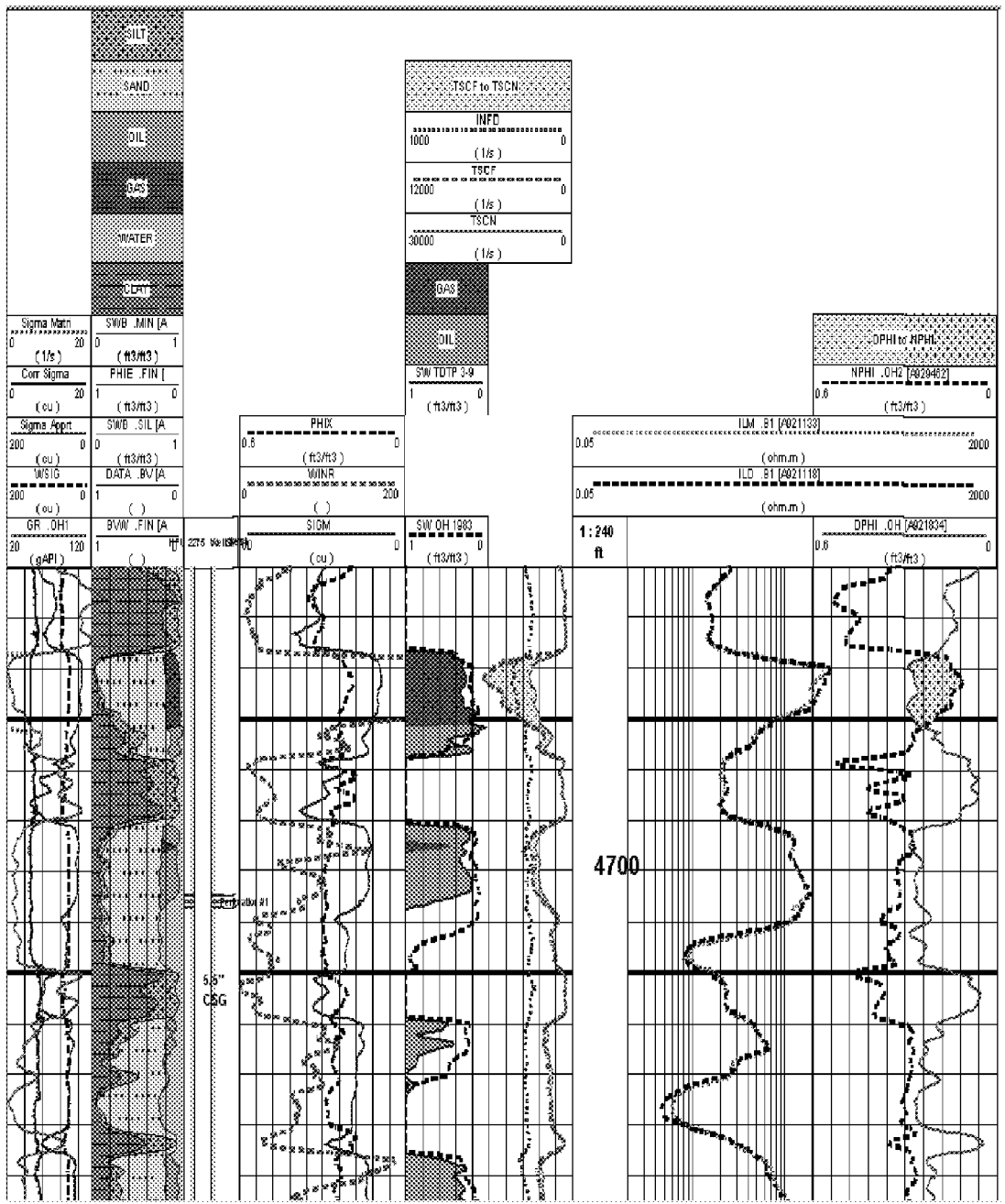
FIG. 4B shows a calculated reservoir fluid saturations obtained using RST sigma results. The use of corrected borehole fluid salinity in accordance with one embodiment of the invention improves the final results.

Embodiments of the invention have also been applied in field tests. As shown in FIGS. 4A and 4B, methods of the invention produce very reliable results under real world conditions. Data in FIGS. 4A and 4B are from RST™ logging performed in a field located in East Texas. The well has been in production for over 60 years. These completion zones produce oil with a moderate-to-high water cut. The RST™ log was run to monitor the gas/oil contact in the reservoir.

FIG. 4A shows the basic RST™ log with the BSAL measurement in track 1. Using methods of the invention and the formation sigma log, the borehole fluid salinities at various depths are determined to be about 122-127 kppm. These values are in good agreement with the value determined with a produced formation water, which shows a water salinity of approximately the same value (125 kppm). The open hole $R_w$ measurements also predict the salt concentration to be in this range. The higher borehole salinity at the bottom of the log is due to the completion fluid in the borehole sump.

FIG. 4B shows the calculated reservoir fluid saturations obtained using the RST™ sigma results. In accordance with embodiments of the invention, the use of correct borehole fluid (and reservoir fluid) salinity in the calculations improves the final results.

Methods in accordance with embodiments of the invention may be implemented as a software (program), which may be stored in a memory in a system that includes a processor to perform the instructions of the program. The system may be on a downhole tool or on the surface.

Figure 5:
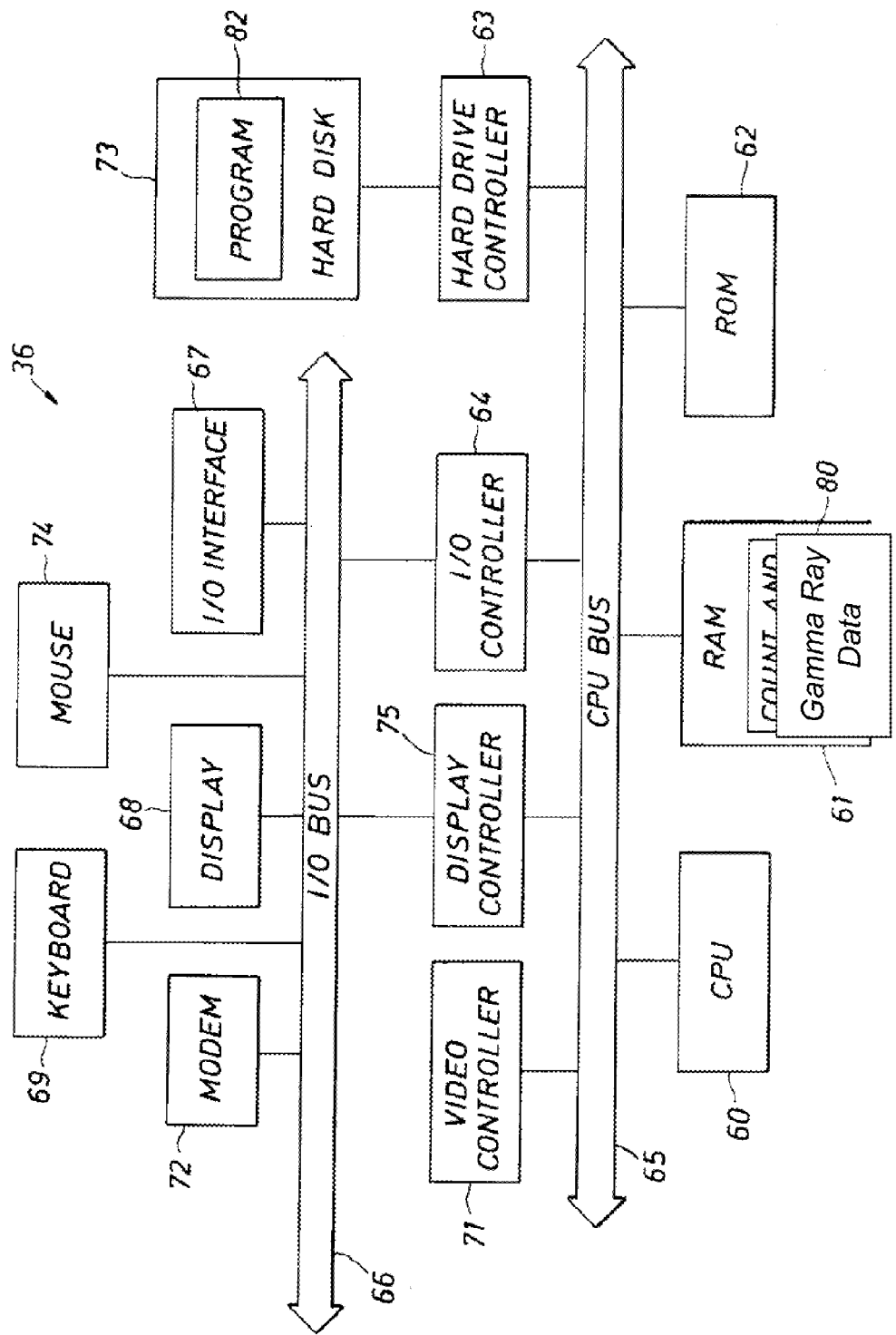
FIG. 5 shows a schematic illustrating a system in accordance with one embodiment of the invention.

For example, as shown in FIG. 5, a program 82 may contain executable instructions for a computer 36 to carry out a method of the invention. The computer 36 may include, among other things, a processor 60, a random access memory (RAM) 61, a nonvolatile memory 62 (for example, a writable read-only memory (ROM) such as a flash ROM), a hard drive controller 63, a video controller 71, a display controller 75, and an input/output (I/O) controller 64 coupled by a processor (CPU) bus 65. The computer 36 may be preprogrammed, e.g., in ROM, or it may be programmed by loading the program 82 from another source, such as a hard or floppy disk, a CD-ROM, or another computer. The gamma data 80 described above may be stored temporarily in RAM 61.

The hard drive controller 63 is coupled to a hard disk 73 suitable for storing executable computer programs, including the program 82, and information such as gamma ray data 80 temporarily stored in RAM 61. The I/O controller 64 is coupled by means of an I/O bus 66 to an I/O interface 67. The I/O interface 67 receives and transmits data in analog or digital form over communication links such as a serial link, local area network, wireless link, or parallel link. Also typically coupled to the I/O bus 66 are a display 68, a keyboard 69, a pointing device such as a mouse 74, and a network connector 72 for connecting the computer 36 to another computer or to a computer network, e.g., to an Internet service provider (ISP) or an on-line service provider (OSP). Alternatively, separate connections (i.e., separate buses) may be used for some of the components connected to the I/O bus 66, including the I/O interface 67, the display 68 and the keyboard 69.

While FIG. 5 illustrates an example of a computing system that can used with embodiments of the invention. One skilled in the art would appreciate that embodiments of the invention are not limited to specific configurations of computing systems. For example, the computing unit may include more or fewer components as illustrated in FIG. 5. In addition, the computer unit may be onboard a downhole tool (e.g., the processor unit 118 in FIG. 1) or on the surface (e.g., the surface equipment 7 in FIG. 1, or any suitable computer in a laboratory or an office).

Advantages of embodiments of the invention may include one or more of the following. Measurements of pulsed neutron capture tools (e.g., RST™) make it possible to perform downhole calibrations of the sigma measurements. Embodiments of the invention provide methods for performing such downhole calibration. These methods can provide more accurate determinations of water salinity, which in turns can provide more accurate water saturation. For example, the measured borehole salinity can be correlated with the formation water salinity through the analysis of the measured water sand sigma. This process provides a means to calibrate the overall accuracy of the formation sigma measurements and, therefore, provides a technique to verify the Water Saturation (Sw) estimates for the productive zones of interest. Therefore, methods of the invention can provide more accurate water saturation (Sw) estimates, which in turn would afford more accurate determination of the quantities of hydrocarbons in the formations.

While the invention has been described with respect to a limited number of examples, those skilled in the art, having benefit of this disclosure, will appreciate that other examples can be devised which do not depart from the scope of the invention as disclosed herein. Accordingly, the scope of the invention should be limited only by the attached claims.

What is claimed is:

1. A method for logging a subsurface formation, comprising:
   acquiring neutron capture data using a pulsed neutron tool at a plurality of locations along a borehole penetrating the subsurface formation, wherein the plurality of locations include a formation zone that contains water;
   comparing an apparent water salinity or an apparent water sigma value estimated from the neutron capture data acquired in the formation zone that contains water with a water salinity or water sigma value of a water sample from the subsurface formation to produce a calibration parameter for the neutron capture data; and
   correcting the neutron capture data, based on the calibration parameter, to produce corrected neutron capture data.

2. The method of claim 1, further comprising determining a water saturation from the corrected neutron capture data.

3. The method of claim 2, further comprising estimating a hydrocarbon content based on the water saturation.

4. The method of claim 1, wherein the water salinity or water sigma value of the water sample is determined in a laboratory.

5. The method of claim 4, wherein the water salinity or water sigma value of the water sample is determined by titration to determine a concentration of sodium chloride (NaCl) in the water sample.

6. The method of claim 1, wherein the water salinity or water sigma value of the water sample is determined in the borehole in a zone that produces formation water.

7. The method of claim 1, wherein the pulsed neutron tool is a dual-burst type neutron tool.

8. A system for analyzing neutron capture data from a subsurface formation, comprising a processor and a memory, wherein the memory stores a program having instructions for:
   obtaining neutron capture data acquired at a plurality of locations along a borehole penetrating the subsurface formation, wherein the plurality of locations include a formation zone that contains water;
   comparing an apparent water salinity or an apparent water sigma value estimated from the neutron capture data acquired in the formation zone that contains water with a water salinity or water sigma value of a water sample from the subsurface formation to produce a calibration parameter for the neutron capture data; and
   correcting the neutron capture data, based on the calibration parameter, to produce corrected neutron capture data.

9. The system of claim 8, wherein the program further comprises instructions for determining a water saturation from the corrected neutron capture data.

10. The system of claim 9, wherein the program further comprises instructions for determining a hydrocarbon content based on the water saturation.

11. The system of claim 8, wherein the system is part of a downhole tool.

12. The system of claim 11, wherein the downhole tool is a pulsed neutron tool.

13. The system of claim 12, wherein the pulsed neutron tool is a dual-burst type neutron tool.

14. A downhole pulsed neutron tool for analyzing neutron capture data from a subsurface formation, comprising a processor and a memory, wherein the memory stores a program having instructions for:

obtaining neutron capture data acquired at a plurality of locations along a borehole penetrating the subsurface formation, wherein the plurality of locations include a formation zone that contains water;

comparing an apparent water salinity or an apparent water sigma value estimated from the neutron capture data acquired in the formation zone that contains water with a water salinity or water sigma value of a water sample from the subsurface formation to produce a calibration parameter for the neutron capture data; and correcting the neutron capture data, based on the calibration parameter, to produce corrected neutron capture data.

15. A downhole tool according to claim 14 wherein said tool is a wireline logging tool.

16. A downhole tool according to claim 14 wherein said tool is a logging-while-drilling neutron tool.

17. A downhole tool according to claim 14 wherein the pulsed neutron tool is a dual-burst type neutron tool.

* * * * *

UNITED STATES PATENT AND TRADEMARK OFFICE
Certificate

Patent No. 8,129,673 B2                                                                                                    Patented: March 6, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John F. Vaeth, Slidell, LA (US); and Charles W. Morris, The Woodlands, TX (US).

Signed and Sealed this Nineteenth Day of February 2013.

<div style="text-align:right">

DAVID P. PORTA
*Supervisory Patent Examiner*
Art Unit 2884
Technology Center 2800

</div>